United States Patent [19]

Kiss et al.

[11] Patent Number: 4,767,567

[45] Date of Patent: Aug. 30, 1988

[54] PROCESS FOR PRODUCING LUMINOUS MATERIAL BASED ON MANGANESE ACTIVATED ZINC SILICATE

[75] Inventors: Akos Kiss, Aschaffenburg; Peter Kleinschmit, Hanau; Werner Völker, Bad Vilbel; Günter Halbritter, Schöllkrippen, all of Fed. Rep. of Germany

[73] Assignee: Degussa Aktiengesellschaft, Frankfurt am Main, Fed. Rep. of Germany

[21] Appl. No.: 9,031

[22] Filed: Jan. 29, 1987

Related U.S. Application Data

[63] Continuation of Ser. No. 719,955, Apr. 4, 1985, abandoned.

[30] Foreign Application Priority Data

Apr. 14, 1984 [DE] Fed. Rep. of Germany ....... 3414124

[51] Int. Cl.$^4$ .............................................. C09K 11/64
[52] U.S. Cl. ............................................... 252/301.6 F
[58] Field of Search ................................... 252/301.6 F

[56] References Cited

U.S. PATENT DOCUMENTS

| | | | |
|---|---|---|---|
| 2,247,192 | 6/1941 | Fonda | 252/301.6 F |
| 3,300,670 | 1/1967 | Veres | 252/301.6 F X |
| 3,416,019 | 12/1968 | Kaduk | 252/301.6 F X |

FOREIGN PATENT DOCUMENTS 15382 9/1980 European Pat. Off. .

OTHER PUBLICATIONS

Römpps, Chemie-Lexikon, pp. 3971-3972.
Zeolite Molecular Sieves, Donald W. Breck, John Wiley & Sons 1974, pp. 83-87 and 133, Prospectus: Sodium Aluminium Silicate HAB A40 DEGUSSA.

Primary Examiner—Jack Cooper
Attorney, Agent, or Firm—Cushman, Darby & Cushman

[57] ABSTRACT

There are described luminescent materials based on zinc silicate activated with manganese which are not sensitive to impurities are not susceptible to pulverizing, are temperature stable, and are stable to the customary ceramic glazes. They comprise, consist of (or consist essentially of):

1.5 to 94.8 mole % zinc oxide (ZnO)
1 to 90 mole % Silicon dioxide ($SiO_2$)
0.2 to 1.3 mole % Manganese oxide (MnO)
0.1 to 25 mole % Alkali oxide and/or Alkaline earth oxide and/or Titanium oxide ($TiO_2$) and/or Zirconium oxide ($ZrO_2$) and/or Chromium oxide ($Cr_2O_3$) and/or Lead oxide (PbO)
0.1 to 23.8 mole % Sodium oxide ($Na_2O$)
1.3 to 24 mole % Aluminum oxide ($Al_2O_3$) and
2.5 to 48 mole % Silicon dioxide ($SiO_2$).

8 Claims, No Drawings

PROCESS FOR PRODUCING LUMINOUS MATERIAL BASED ON MANGANESE ACTIVATED ZINC SILICATE

This is a continuation of application Ser. No. 719,955, filed Apr. 4, 1985, which was abandoned upon the filing hereof.

BACKGROUND OF THE INVENTION

The invention is directed to luminescent materials based zinc silicate activated with manganese ($Zn_2SiO_4$:Mn), as well as a process for producing them.

Luminescent materials are solid substances which are capable of emitting light after absorbing energy (e.g. daylight, ultraviolet light, rontgen rays (X-rays) or corpuscular rays), which emitted light generally exhibits a greater wave length than that of the absorbed ray. The light radiation occurs during the excitation itself and at various lengths of time thereafter, which can be from milliseconds to hours.

Luminescent materials find expanding use, such as for example, in lighting engineering to increase the energy yield in mercury lamps, in X-ray diagnostics, or in the coating of television tubes to make visible the modulated electron beam. Besides they are used as coatings for ceramic products, especially in glazes for ceramic tiles.

Only a few inorganic compounds are capable of luminescence. Generally the luminescence capability is first acquired through an activation, for example, by building small amounts of ions (activators) foreign to the crystal lattice into the crystal lattice (host lattice) of the inorganic compound (base material). Therefore in the activator containing luminescent materials it is a matter of crystallized compounds in which a few cations of the base materials are replaced by foreign cations. The built in cations with the surrounding band of anions thereby has been conceived as the so-called luminescent centers which are responsible for the characteristic absorptions and emissions.

As base materials for the luminescent materials of significance above all are salts of the alkaline earths and their side group elements zinc and cadmium such as phosphates, silicates, borates, aluminates and oxides. As activators there are preferably used the rare earths and heavy metals, such as manganese, lead, tin, or antimony.

The luminescent materials generally must be very pure and have a crystal lattice as free as possible from disturbances since impurities in the starting materials act as quench centers and reduce the luminescent intensity of the luminescent materials. Lattice defects act similarly. The luminescent capability is damaged in the mechanical comminution of the compounds and in the extreme care can be completely destroyed.

The previously known luminescent materials have the further disadvantage that most of them are not temperature stable and disintegrate in many fritted glasses. Therefore they are not suitable as pigments in glazes for ceramic tiles which require firing temperatures of over 700° to 800° C.

Together with manganese activated zinc orthosilicate ($Zn_2SiO_4$:Mn), which occurs in nature as willemite, there is a known luminescent material which upon excitation with short wave ultraviolet light (254 µm) emits in the green region. There must be employed very pure starting compounds in the form of zinc oxide, silica and manganese carbonate for the synthetic production of these luminescent materials. These additions increase considerably the expense of the final product. Besides the luminescent materials must not be ground after the last calcining, since otherwise the luminescing power is reduced.

There are known from European Pat. No. 15382 luminescent materials based on zinc silicate dosed with manganese ($Zn_2SiO_4$:Mn) in which a portion of the silicon is substituted by ion pairs from Group III A and Group V A of the periodic system of elements. These luminescent materials also must be produced from highly pure compounds by calcining, whereby the final product is sensitive to grinding and not resistant to the majority of the customary glazes.

Therefore, it was the problem of the present invention to develop luminescent materials based on manganese activated zinc silicate ($Zn_2SiO_4$:Mn) which can be produced at practically the same light intensity from commercial starting components having a lesser degree of purity, which are not sensitive to grinding and are as temperature stable and chemically stable to ceramic glazes as the known luminescent materials. Besides there is needed a process for the production of these luminescent materials.

SUMMARY OF THE INVENTION

This problem was solved according to the invention by providing a luminescent material which consists of (or consists essentially of):

- 1.5 to 94.8 mole % Zinc oxide (ZnO)
- 1 to 90 mole % Silicon dioxide ($SiO_2$)
- 0.2 to 1.3 mole % Manganese oxide (MnO)
- 0.1 to 25 mole % Alkali oxide and/or Alkaline earth oxide and or Titanium oxide ($TiO_2$) and/or Zirconium oxide ($ZrO_2$) and/or Chromium oxide ($Cr_2O_3$) and/or Lead oxide (PbO)
- 0.1 to 23.8 mole % Sodium oxide ($Na_2O$)
- 1.3 to 24 mole % Aluminum oxide ($Al_2O_3$) and
- 2.5 to 48 mole % Silicon dioxide ($SiO_2$) in the form of a zeolite phase.

As alkali oxides there are used for example $Na_2O$ and $K_2O$ and as alkaline earth metal oxides MgO, CaO, SrO, and BaO.

Preferably the luminescent material contains:
- 10 to 60 mole % Zinc oxide (ZnO)
- 10 to 60 mole % Silicon dioxide ($SiO_2$)
- 0.3 to 1.0 mole % Manganese oxide (MnO)
- 5 to 15 mole % Alkali oxide and/or Alkaline earth oxide and/or Titanium oxide (TiO) and/or Zirconium oxide ($ZrO_2$) and/or Chromium oxide ($Cr_2O_3$) and/or Lead oxide (PbO) and containing
- 0.5 to 19.7 mole % sodium oxide ($Na_2O$)
- 1.5 to 20 mole % Aluminum oxide ($Al_2O_3$) and
- 3 to 40 mole % Silicon dioxide ($SiO_2$) in the form of a zeolite phase The luminescent materials can be produced from commercial starting component which are not of high purity, are essentially insensitive to grinding and are capable of resistance against most ceramic glazes. They have an excitation maximum at 230 nm and an emission maximum at 532 nm ($\Delta\lambda = \pm 2$ nm) in the green region with a width at half maximum intensity of about 20 nm.

There are obtained particularly insensitive and luminescent intensive materials in the following range:
- 34 to 44 mole % Zinc oxide (ZnO)
- 10 to 20 mole % Silicon dioxide ($SiO_2$)
- 4 to 0.8 mole % Manganese oxide (MnO)

6 to 10 mole % Oxide (Alkali, Alkaline earth, (TiO$_2$, (ZrO$_2$, Cr$_2$O$_3$, PbO) and containing 9.2 to 12.6 mole % Sodium oxide (Na$_2$O)

10 to 13 mole % Aluminum oxide (Al$_2$O$_3$) and 20 to 26 mole % Silicon dioxide (SiO$_2$) in the form of a zeolite phase.

Preferably there is used an alkaline earth oxide, especially magnesium oxide (MgO).

The employment of a zeolite, preferably of Type A, has the further advantage that the manganese activator is supplied to the product with the help of the zeolite as an ion exchange and consequently can be distributed very uniformly in the luminescent material.

For the production of the luminescent materials of the invention commercial starting materials in the form of oxides or materials which convert into oxides, such as for example zinc oxide or carbonate, silica, magnesite and manganese loaded zeolite are comminuted and mixed well, then the mixture pressed lightly and calcined in a solid body reaction at 850° to 1400° C. for 0.5 to 6 hours in the air. Subsequently the calcined product can be comminuted by grinding.

Preferably the calcining is at 1000° to 1100° C. for 1 to 3 hours.

The composition can consist of or consist essentially of the stated materials.

For the production of the manganese loaded zeolite for example, 200 grams of zeolite (HAB 40 Degussa, a Type A zeolite) was stirred with 5.9 grams of manganese chloride (MnCl$_2$·2H$_2$O) in 1 liter of water at 80° C. for about 4 hours, filtered off, washed and dried at about 120° C.

DETAILED DESCRIPTION

For example there were comminuted 432 grams of zinc oxide, 93 grams of silica, 50 grams of magnesite and 425 grams of manganese loaded zeolite (Type A) and the composition dry mixed for 15 minutes in a mixer. Subsequently the dry mixture was compacted by compression in a ceramic crucible and placed in a chamber furnace which was heated at a rate of about 200° C. per hour. However, there can also be produced blanks from the mixture which are then calcined. The product was calcined at 1050° C. for 90 minutes. The thus produced luminescent material is temperature stable and does not lose significant luminescence by grinding and pressing. Additionally, it is resistant to most ceramic glazes.

The following luminescent materials were produced according to this process.

| ZnO Mole % | SiO$_2$ Mole % | MnO Mole % | Na$_2$O Mole % | Al$_2$O$_3$ Mole % | MexOy Mole % | |
|---|---|---|---|---|---|---|
| 38.7 | 25.5 | 0.9 | 13.0 | 13.9 | 8.0 | MgO |
| 38.7 | 32.5 | 0.5 | 9.9 | 10.4 | 8.0 | MgO |
| 1.6 | 91.5 | 0.7 | 2.5 | 3.2 | 0.5 | CaO |
| 1.9 | 68.6 | 1.1 | 12.9 | 14.0 | 1.5 | TiO$_2$ |
| 20.8 | 62.1 | 0.4 | 1.6 | 2.0 | 13.1 | MgO |
| 5.3 | 50.2 | 1.3 | 20.9 | 22.2 | 0.1 | Cr$_2$O$_3$ |
| 22.2 | 43.8 | 0.8 | 10.0 | 10.8 | 12.4 | CaO |
| 22.6 | 34.8 | 0.7 | 11.5 | 12.2 | 18.2 | MgO |
| 23.2 | 28.3 | 0.3 | 12.9 | 13.2 | 22.1 | MgO |
| 69.8 | 17.4 | 0.5 | 5.7 | 6.2 | 0.4 | ZrO$_2$ |
| 90.1 | 5.4 | 0.6 | 1.6 | 2.2 | 0.1 | PbO |

What is claimed is:

1. A process for forming a luminescent material containing manganese-activated zinc silicate (Zn$_2$SiO$_4$:Mn) comprising the steps of:
   (1) forming a mixture in comminuted form corresponding to the formulation of
      (a) 1.5 to 94.8 mole % of zinc oxide (ZnO),
      (b) 1 to 90 mole % of silicon dioxide (SiO$_2$),
      (c) 0.2 to 1.3 mole % of manganese oxide (MnO),
      (d) 0.1 to 25 mole % of at least one member of the group consisting of alkali oxide, alkaline earth oxide, titanium dioxide, zirconium dioxide, chromium oxide (Cr$_2$O$_3$) and lead oxide (PbO),
      (e) 0.1 to 23.8 mole % of sodium oxide (Na$_2$O),
      (f) 1.3 to 24 mole % of aluminum oxide (Al$_2$O$_3$), and
      (g) 2.5 to 48 mol. % of silicon dioxide (SiO$_2$), and wherein materials (a), (b), and (d) are oxides or compounds which are converted into oxides under the calcining conditions of step (3), and wherein materials (c), (e), (f) and (g) are in the form of a maganese loaded -A- zeolite;
   (2) lightly compacting the mixture of step (1); and
   (3) calcining in air the lightly compacted mixture of step (2) at 850° C. to 1400° C. for from 0.5 to 6 hours.

2. A process according to claim 1, wherein step (3) is at 1000° to 1100° C. for 1 to 3 hours.

3. A process according to claim 1, wherein (d) is CaO, MgO, TiO$_2$, Cr$_2$O$_3$, PbO, or ZrO$_2$.

4. A process according to claim 1, wherein (d) is MgO.

5. A process according to claim 1, wherein the mixture of step (1) consists essentially of:
   (a) 10 to 60 mole % zinc oxide (ZnO),
   (b) 10 to 60 mole % silicon dioxide (SiO$_2$),
   (c) 0.3 to 1 mole % manganese oxide (MnO),
   (d) 5 to 15 mole % of at least one member of the group consisting of alkali oxide, alkaline earth oxide, titanium dioxide, zirconium dioxide, chromium oxide (Cr$_2$O$_3$) and lead oxide,
   (e) 0.5 to 19.7 mole % sodium oxide (Na$_2$O),
   (f) 1.5 to 20 mole % aluminum oxide (Al$_2$O$_3$), and
   (g) 3 to 40 mole % silicon dioxide (SiO$_2$);
wherein (c), (e), (f) and (g) are in the form of a manganese loaded -A- zeolite.

6. A process according to claim 5, wherein (d) is MgO.

7. A process according to claim 1, wherein the mixture of step (1) consists essentially of
   (a) 34 to 44 mole % zinc oxide (ZnO),
   (b) 10 to 20 mole % silicon dioxide (SiO$_2$),
   (c) 0.4 to 0.8 mole % manganese oxide (MnO),
   (d) 6 to 10 mole % of at least one member of the group consisting of alkali oxide, alkaline earth oxide, titanium dioxide, zirconium dioxide, chromium oxide (Cr$_2$O$_3$) and lead oxide (PbO),
   (e) 9.2 to 12.6 mole % sodium oxide (Na$_2$O),
   (f) 10 to 13 mole % aluminum oxide (Al$_2$O$_3$), and
   (g) 20 to 26 mol. % silicon oxide (SiO$_2$); wherein (c), (e), (f) and (g) are in the form of manganese loaded -A- zeolite.

8. A process according to claim 7, wherein (d) is MgO.

* * * * *